US012590270B2

(12) United States Patent
Liu et al.

(10) Patent No.: US 12,590,270 B2
(45) Date of Patent: Mar. 31, 2026

(54) CLEANING COMPOSITION, METHOD FOR PREPARING THE SAME AND USE THEREOF

(71) Applicants: Henkel AG & Co. KGaA, Duesseldorf (DE); Guangdong Yingde Dosoon Fine Chemical Industry Co., Ltd., Qingyuan (CN)

(72) Inventors: GuoGuang Liu, Shanghai (CN); HongYu Chu, Shanghai (CN); Bo Xu, Shanghai (CN); Xiaohui Pan, Lianzhou (CN); Zengfan Liu, Guangzhou (CN)

(73) Assignees: Henkel AG & Co. KGaA, Duesseldorf (DE); Guangdong Yingde Dosoon Fine Chemical Industry Co., Ltd., Qingyuan (CN)

( * ) Notice: Subject to any disclaimer, the term of this patent is extended or adjusted under 35 U.S.C. 154(b) by 324 days.

(21) Appl. No.: 18/513,735

(22) Filed: Nov. 20, 2023

(65) Prior Publication Data

US 2024/0093123 A1 Mar. 21, 2024

Related U.S. Application Data

(63) Continuation of application No. PCT/CN2021/096912, filed on May 28, 2021.

(51) Int. Cl.

| | |
|---|---|
| ***C11D 1/72*** | (2006.01) |
| ***C11D 3/00*** | (2006.01) |
| ***C11D 3/04*** | (2006.01) |
| ***C11D 3/18*** | (2006.01) |
| ***C11D 3/20*** | (2006.01) |
| ***C11D 3/43*** | (2006.01) |
| ***C11D 17/00*** | (2006.01) |

(52) U.S. Cl.

CPC ............ *C11D 3/182* (2013.01); *C11D 3/0052* (2013.01); *C11D 3/04* (2013.01); *C11D 3/201* (2013.01); *C11D 3/2068* (2013.01); *C11D 3/2072* (2013.01); *C11D 3/2093* (2013.01); *C11D 3/43* (2013.01); *C11D 17/0043* (2013.01); *C11D 1/72* (2013.01); *C11D 3/181* (2013.01); *C11D 2111/14* (2024.01); *C11D 2111/18* (2024.01)

(58) Field of Classification Search

CPC ........... C11D 1/72; C11D 3/181; C11D 3/182; C11D 3/201; C11D 3/2093; C11D 3/0052; B08B 3/08; B08B 3/10

USPC ............... 510/183, 185, 189, 238, 421, 505; 134/40, 42

See application file for complete search history.

(56) References Cited

U.S. PATENT DOCUMENTS

| | | | | | |
|---|---|---|---|---|---|
| 5,454,969 | A * | 10/1995 | Fields | C11D 7/261 510/412 | |
| 6,197,285 | B1 * | 3/2001 | Kowalik | A61K 8/894 424/401 | |
| 2013/0032296 | A1 | 2/2013 | Zhong et al. | | |
| 2019/0256806 | A1 | 8/2019 | Nietfeld | | |

FOREIGN PATENT DOCUMENTS

| | | | |
|---|---|---|---|
| CN | 1311294 | A | 9/2001 |
| CN | 102191141 | A | 9/2011 |
| CN | 104312779 | A | 1/2015 |
| CN | 105316128 | A | 2/2016 |
| CN | 105623915 | A | 6/2016 |
| CN | 106635549 | A | 5/2017 |
| CN | 108865519 | A | 11/2018 |
| EP | 3617300 | A1 | 7/2013 |
| JP | H02248500 | A | 10/1990 |
| JP | H02302500 | A | 12/1990 |
| JP | H0326798 | A | 2/1991 |
| JP | H09279187 | A | 10/1997 |
| JP | H11335697 | A | 12/1999 |

OTHER PUBLICATIONS

International Search Report—PCT/CN2021/096912, mailed Feb. 24, 2022.

* cited by examiner

*Primary Examiner* — Gregory R Delcotto
(74) *Attorney, Agent, or Firm* — Mary K. Cameron

(57) ABSTRACT

Provided is a cleaning composition contained in an aerosol spray can, methods of making and using the cleaning composition, which comprises: a liquid cleaning mixture, comprising: a) a solvent selected from the group consisting of isohexane, isoheptane, and n-heptane and mixtures thereof; b) a de-aromatized hydrocarbon solvent having 7 to 8 carbon atoms in its molecule; c) a branched aliphatic alkane having 10 to 11 carbon atoms; d) from 5 to 15 parts by weight of ethanol, e) from 1 to 15 parts by weight of isopropanol, f) from 1 to 10 parts by weight of acetone, and g) from 0.01 to 0.2 parts by weight of iso-tridecanol polyoxyethylene ether having a HLB value of 12 to 13, and a gas propellant.

15 Claims, No Drawings

CLEANING COMPOSITION, METHOD FOR PREPARING THE SAME AND USE THEREOF

This invention relates to a cleaning composition contained in an aerosol spray can, a method for preparing the same and use thereof.

DESCRIPTION OF RELATED ART

In the field of vehicle (e.g., automobiles) repair, and machinery cleaning and maintenance, various cleaning formulations are known. However, due to the difficulty to remove deposited oily fouling, and the complexity and inaccessibility of the surfaces of different parts, commercially available cleaning formulations cannot always satisfactorily balance good cleaning ability and health/environment concerns.

BRIEF SUMMARY OF THE INVENTION

An object of the present invention is to provide a cleaning composition which greatly balances the cleaning ability and health/environment concerns. Surprisingly; the cleaning composition in the present invention has a strong cleaning ability, an appropriate drying speed, a low toxicity, and a slight odor, and is convenient for end customers to use.

In one aspect, the present invention relates to a cleaning composition contained in an aerosol spray can, comprising:

a liquid cleaning mixture, comprising:

- a) from 25 to 35 parts by weight of a solvent selected from the group consisting of isohexane, isoheptane, n-heptane and mixtures thereof,
- b) from 18 to 30 parts by weight of a de-aromatized hydrocarbon solvent having 7 to 8 carbon atoms in its molecule, which has a distillation range of from 120 to 160° C. and a closed cup flash point of about 20° C.,
- c) from 5 to 15 parts by weight of a branched aliphatic alkane having 10 to 11 carbon atoms, which has a distillation range of from 161 to 173° C. and a closed cup flash point of about 44° C.,
- d) from 5 to 15 parts by weight of ethanol,
- e) from 1 to 15 parts by weight of isopropanol,
- f) from 1 to 10 parts by weight of acetone, and
- g) from 0.01 to 0.2 parts by weight of iso-tridecanol polyoxyethylene ether having an HLB value of 12 to 13, and a gas propellant.

In another aspect, the present invention relates to a method for preparing the cleaning composition of the present invention, comprising:

mixing components a) to g) to obtain a liquid cleaning mixture, packaging the liquid cleaning mixture into an aerosol spray can and sealing the can, and filling the gas propellant into the sealed can.

In a further aspect, the present invention relates to the use of the cleaning composition according to the present invention in cleaning a part of a vehicle or a machine, wherein the vehicle is preferably an automobile, and the part is preferably a brake disc.

DETAILED DESCRIPTION OF THE INVENTION

In the following passages the present invention is described in more detail. Each aspect so described may be combined with any other aspect or aspects unless clearly indicated to the contrary. In particular, any feature indicated as being preferred or advantageous may be combined with any other feature or features indicated as being preferred or advantageous.

In the context of the present invention, the terms used are to be construed in accordance with the following definitions, unless a context dictates otherwise.

As used herein, the singular forms "a", "an" and "the" include both singular and plural referents unless the context clearly dictates otherwise.

The terms "comprising", "comprises" and "comprised of" as used herein are synonymous with "including", "includes" or "containing", "contains", and are inclusive or open-ended and do not exclude additional, non-recited members, elements, or process steps.

The recitation of numerical end points includes all numbers and fractions subsumed within the respective ranges, as well as the recited end points.

In the context, each numerical value may have a derivation of 10% of the numerical value being referred to. For example, numerical value "5" represents a numerical range of 5±0.5, i.e., 4.5 to 5.5.

All references cited in the present specification are hereby incorporated by reference in their entirety.

The "closed cup flash point" is measured according to ASTM D56.

The "distillation range" is measured according to ASTM D86.

All operations, steps, and methods are carried out at room temperature and under atmospheric pressure, unless the context clearly dictates otherwise or obviously contradicts.

Unless otherwise defined, all terms used in the disclosure of the invention, including technical and scientific terms, have the meaning as commonly understood by one of ordinary skill in the art to which this invention belongs. By means of further guidance, term definitions are included to better appreciate the teaching of the present invention.

Cleaning Composition

In one aspect, the present invention relates to a cleaning composition contained in an aerosol spray can, comprising:

a liquid cleaning mixture, comprising:

- a) from 25 to 35 parts by weight of a solvent selected from the group consisting of isohexane, isoheptane, n-heptane and mixtures thereof,
- b) from 18 to 30 parts by weight of a de-aromatized hydrocarbon solvent having 7 to 8 carbon atoms in its molecule, which has a distillation range of from 120 to 160° C. and a closed cup flash point of about 20° C.,
- c) from 5 to 15 parts by weight of a branched aliphatic alkane having 10 to 11 carbon atoms, which has a distillation range of from 161 to 173° C. and a closed cup flash point of about 44° C.,
- d) from 5 to 15 parts by weight of ethanol,
- e) from 1 to 15 parts by weight of isopropanol,
- f) from 1 to 10 parts by weight of acetone, and
- g) from 0.01 to 0.2 parts by weight of iso-tridecanol polyoxyethylene ether having a HLB value of 12 to 13, and a gas propellant.

In some examples, the cleaning composition according to the present invention comprises:

a liquid cleaning mixture, comprising:

- a) from 28 to 32, preferably about 30 parts by weight of isohexane,
- b) from 18 to 22, preferably about 20 parts by weight of a de-aromatized hydrocarbon solvent having 7 to 8 carbon atoms in its molecule, which has a distillation range of from 120 to 160° C. and a closed cup flash point of about 20° C., such as D20,
- c) from 5 to 10, preferably 10 parts by weight of a branched aliphatic alkane having 10 to 11 carbon atoms, which has a distillation range of from 161 to 173° C. and a closed cup flash point of about 44° C., such as isoparaffin G, d) from 8 to 10, preferably 10 parts by weight of ethanol, e) from 4 to 6, preferably 5 parts by weight of isopropanol, f) from 4 to 6, preferably 5 parts by weight of acetone, and g) from 0.1 to 0.2, preferably 0.1 parts by weight of iso-tridecanol polyoxyethylene ether having a HLB value of 12 to 13, preferably having a HLB value of 12, and a gas propellant.

The liquid cleaning mixture according to the present invention has advantages including low toxicity, low cost, strong dissolving ability and appropriate drying speed. The gas propellant in combination with the aerosol spray makes the cleaning composition convenient for end customers to use, increases the cleaning force applied onto the fouling, and prevents residual cleaning composition from remaining on the walls and bottom of the container.

The cleaning composition according to the present invention has a cleaning ability of 90% or more, preferably 95% or more, and most preferably 99% or more, wherein the cleaning ability represents the ratio of the mass of the fouling removed by the cleaning composition from the fouled surface to the total mass of the fouling on the fouled surface.

The cleaning composition according to the present invention has a drying speed of from 3 to 4 minutes, preferably from 3 to 3.5 minutes, wherein the drying speed represents the time period for the solvent in the cleaning composition to evaporate at room temperature and under atmospheric pressure. A drying speed of from 3 to 4 minutes, preferably from 3 to 3.5 minutes, is advantageous since it ensures sufficient penetration into the fouling and desired cleaning efficiency.

Component a)

The cleaning composition comprises from 25 to 35, preferably from 28 to 32 parts by weight of a solvent selected from the group consisting of isohexane, isoheptane, and n-heptane and mixtures thereof. Isohexane, isoheptane, and n-heptane have good dissolving ability for nonpolar oily fouling, high volatile speed and low toxicity. Preferably, component a) is isohexane which shows an extremely high cleaning ability and is cost-effective.

Component b)

The cleaning composition comprises from 18 to 30, preferably from 18 to 22 parts by weight of a de-aromatized hydrocarbon solvent having 7 to 8 carbon atoms in its molecule, which has a distillation range of from 120° to 160° C. and a closed cup flash point of about 20° C.

De-aromatized hydrocarbon solvents have been subjected to dc-aromatization, and thus have very little to no aromatic contents and are environmentally friendly. De-aromatized hydrocarbon solvents are usually de-aromatized aliphatic alkane mixtures, and mainly comprise n-alkanes. They have good penetration force and dissolution ability to nonpolar oily fouling and can effectively remove oily fouling attached to the surfaces of vehicles and machines. They are miscible with petroleum solvents, including component a) solvent and component c) branched aliphatic alkane (i.e., isoparaffin), as well as component d) ethanol.

De-aromatized hydrocarbon solvents are commercially available, e.g., from Industrial Chemical Technologies, from Pure Chems under the tradename EXXSOL, or from Mobil. Preferably, the de-aromatized hydrocarbon solvent is D20. D20 is a mixture of 40 parts by weight of C7 alkane and 60 parts by weight of C8 alkane, has a distillation range of 120 to 160° C., and a closed cup flash point of about 20° C.

Component c)

The cleaning composition comprises from 5 to 15, preferably from 5 to 10 parts by weight of a branched aliphatic alkane having 10 to 11 carbon atoms, which has a distillation range of from 161 to 173° C. and a closed cup flash point of about 44° C. Branched aliphatic alkanes (also known as "isoparaffins") have low surface tension and strong cohesion, and thus they have good penetration force and dissolution ability to nonpolar oily fouling and can effectively remove oily fouling attached to the surfaces of vehicles and machines. In addition, isoparaffins are easy to recycle and cost-effective. Isoparaffins have low odor, and have better biodegradation than aromatics, and thus isoparaffins are harmless to human being and environment.

Isoparaffins are commercially available e.g., from Pure Chems under the tradename EXXSOL, or from ExxonMobil. Preferably, the isoparaffin is isoparaffin G. Isoparaffin G is a mixture of C10 branched aliphatic alkane and C11 branched aliphatic alkane, has a distillation range of 161 to 173° C., and a closed cup flash point of about 44° C.

Component d)

The cleaning composition comprises from 5 to 15, preferably from 8 to 10 parts by weight of ethanol. Ethanol can dissolve various inorganic and organic substances (including oily fouling). Ethanol has a good cleaning ability to carbon deposits, gums, dusts, iron rusts, and water marks. Ethanol can increase contact area of the cleaning composition with the mechanical parts to be cleaned and improve the cleaning speed.

Component e)

The cleaning composition comprises from 1 to 15, preferably from 4 to 6 parts by weight of isopropanol. Isopropanol has a strong dissolving ability to lipophilic substances. Isopropanol has a good cleaning ability to carbon deposits, gums, dusts, iron rusts, and water marks. In addition, isopropanol has a good compounding effect with component d) ethanol.

Component f)

The cleaning composition comprises from 1 to 10, preferably from 4 to 6 parts by weight of acetone. Acetone has better dissolving ability to oily fouling. Acetone has a good cleaning ability to carbon deposits, gums, dusts, iron rusts, and water marks.

Component g)

The cleaning composition comprises 0.01 to 0.2, preferably from 0.1 to 0.2 parts by weight of iso-tridecanol polyoxyethylene ether having a HLB value of 12 to 13. Iso-tridecanol polyoxyethylene ether is obtained through the polymerization of isotridecanol and ethylene oxide. Iso-tridecanol polyoxyethylene ether is a non-ionic surfactant, and has good emulsifying and cleaning property. Iso-tridecanol polyoxyethylenes are commercially available e.g., from Haian Petrochem, Jiangsu Province.

According to the present invention, the iso-tridecanol polyoxyethylene has a HLB value of 12 to 13, and preferably 12. With the HLB value falling within this range, the iso-tridecanol polyoxyethylene has appropriate solubilization and cleaning property, and uniform emulsification.

Preferably, component g) is selected from the group consisting of iso-tridecanol polyoxyethylene ether 1307 having a HLB value of 12 and iso-tridecanol polyoxyethylene ether 1308 having a HLB value of 13, more preferably iso-tridecanol polyoxyethylene ether 1307 having a HLB value of 12.

Gas Propellant

The composition comprises a gas propellant, which in combination with the aerosol spray makes the cleaning composition convenient for end customers to use. In addition, it ensures sufficient penetration into the fouling and desired cleaning efficiency, and prevents residual cleaning composition from retaining on the walls and bottom of the container.

There is no specific limitation on the gas propellant, and those commonly known as propellants for liquid cleaning compositions are available, as long as they do not adversely influence the effects of the present invention. In some examples, the gas propellant comprises a gas selected from the group consisting of carbon dioxide, propane, and butane.

In some examples, the gas propellant comprises:

h) from 1 to 5 parts by weight of carbon dioxide, and i) from 10 to 30 parts by weight of a mixture of propane and butane in a volume ratio of about 1-4:9-6, preferably in a volume ratio of about 3:7. By combining component h) and component i), the gas propellant ensures a very desirable sprayability and inner pressure.

There is no specific limitation on the mass ratio of the liquid cleaning mixture to the gas propellant, as long as it ensures a desirable sprayability and inner pressure. In some examples, the mass ratio of the liquid cleaning mixture to the gas propellant may be about 60-90:40-10, for example, 70:30, 75:35, 80:20, 85:15 or 90:10, which ensures a very desirable sprayability and inner pressure.

There is no specific limitation on the material of the aerosol spray can, as long as it is pressure resistant and corrosion resistant. In some examples, the aerosol spray can is made from electrolytic tin plate iron.

Method for Preparing Cleaning Composition

In another aspect, the present invention provides a method for preparing the cleaning composition of the present invention, comprising:

mixing components a) to g) to obtain a liquid cleaning mixture, packaging the liquid cleaning mixture into an aerosol spray can and sealing the can, and filling the gas propellant into the sealed can.

Optionally, the method further comprising filtering the liquid cleaning mixture before packaging it into the aerosol spray can, for example, via a filter screen.

There is no specific limitation on the manner or order of mixing the components of the liquid cleaning mixture and/or the gas propellant, and those commonly known for mixing are available, as long as they do not adversely influence the effect of the present invention.

Use of the Cleaning Composition

The cleaning composition according to the present invention can be used for cleaning a part of a vehicle or a machine, wherein the vehicle is preferably an automobile, and the part is preferably a brake disc.

In some examples, the part is made from rubbers, or plastics, for example, polypropylene and/or polycarbonate.

EXAMPLES

Materials:

6# solvent oil: containing a mixture of n-hexane, 2,4-dimethyl pentane, 2,3-dimethyl butane, n-pentane, cyclopentane and cyclohexane as main component, and a small amount of aromatic hydrocarbons, available from Maoming petrochemical company.

120# solvent oil: also known as industrial heptane, containing n-heptane, iso-heptane, and cycloheptane, and a small amount of impurities such as aromatic hydrocarbons, sulfur-containing compounds, and nitrogen-containing compounds, available from Maoming petrochemical company.

D20: a mixture of 40 parts by weight of C7 alkane and 60 parts by weight of C8 alkane, having a distillation range of 120 to 160° C., and a closed cup flash point of about 20° C., available from Mobil.

D30: a mixture of 45 parts by weight of C8 alkane and 55 parts by weight of C9 alkane, having a distillation range of 145 to 160° C., and a closed cup flash point of about 30° C., available from Mobil.

D80: a mixture mainly composed of C18 to C30 n-alkanes, having a distillation range of 208 to 237° C., and a closed cup flash point of about 80° C. available from Mobil.

Isoparaffin G: a mixture of C10 branched aliphatic alkane and C11 branched aliphatic alkane, having a distillation range of 161 to 173° C., and a closed cup flash point of about 44° C., available from ExxonMobil.

Isoparaffin C: a mixture of C7 branched alkane and C8 branched alkane, having a boiling range of 99 to 104° C., and a closed cup flash point of below 0° C., available from ExxonMobil.

Isoparaffin E: a mixture of C8 branched alkane and C9 branched alkane, having a boiling range of 113 to 139° C., and a closed cup flash point of about 7° C., available from ExxonMobil.

Isoparaffin H: a mixture of C11 branched aliphatic alkane and C12 branched aliphatic alkane, having a distillation range of 182 to 192° C., and a closed cup flash point of below 54° C., available from ExxonMobil.

Isoparaffin L: a mixture of C11 branched aliphatic alkane and C12 branched aliphatic alkane, having a distillation range of 207 to 253° C., and a closed cup flash point of below 64° C., available from ExxonMobil.

E-1307: iso-tridecanol polyoxyethylene having a HLB value of about 12, available from Haian Petrochem, Jiangsu Province.

E-1308: iso-tridecanol polyoxyethylene having a HLB value of about 13, available from Haian Petrochem, Jiangsu Province.

E-1305: iso-tridecanol polyoxyethylene having a HLB value of about 10.5, available from Haian Petrochem, Jiangsu Province.

E-1306: iso-tridecanol polyoxyethylene having a HLB value of about 11.2, available from Haian Petrochem, Jiangsu Province.

E-1310: iso-tridecanol polyoxyethylene having a HLB value of about 13.5, available from Haian Petrochem, Jiangsu Province.

E-1312: iso-tridecanol polyoxyethylene having a HLB value of about 14.5, available from Haian Petrochem, Jiangsu Province.

E-1315: iso-tridecanol polyoxyethylene having a HLB value between 14.5 to 18, available from Haian Petrochem, Jiangsu Province.

E-1320: iso-tridecanol polyoxyethylene having a HLB value between 14.5 to 18, available from Haian Petrochem, Jiangsu Province.

Preparation of the Cleaning Compositions

The cleaning compositions in the Examples (Ex.) and Comparative Examples (CEx.) were prepared according to formulations listed in the tables below. The amount of each component listed in the Tables below was represented in the unit "parts by weight".

Each of component a) to g) was added into a reactor, and stirred at a rotational speed of 800 r/min for 15 minutes to obtain a base stock. The base stock was filtered via a filter screen (300 mesh). The filtered base stock was packaged into an aerosol spray can. The aerosol can was then sealed. Carbon dioxide, and propane/butane (volume ratio 3:7) were filled into the sealed aerosol spray can with an aerator. A pressing head was assembled onto the aerosol spray can to give the final cleaning composition.

Evaluation of the Prepared Cleaning Composition

Each composition thus obtained was evaluated for its cleaning ability, drying speed, and odor as below.

i) Preparation of Oily Fouling

According to QB/T 2117-1995 General Water-based Metal Detergents, a fouling was prepared by weighing out (by weight) 8% of petroleum sodium sulfonate, 3.5% of lanolin magnesium soap, 2% of lanolin, 30% of industrial Vaseline, 34.5% of 20# machine oil, 12% of 30# machine oil, 2% of calcium soap grease, and 8% of alumina; heating them to 120° C. so as to melt and mix them uniformly; and cooling down the mixture to room temperature to obtain an oily fouling.

ii) Preparation of Test Plate

A steel plate (20 mm*40 mm) was cleaning with anhydrous alcohol and weighed as "M0".

1 g oily fouling prepared in step i) was coated uniformly onto one side of the steel plate. The steel plate with oily fouling coated thereon was weighted as "M1".

iii) Cleaning

The test plate was placed at an inclination angle of 60° from the horizontal direction, and fixed with a clamp. The cleaning composition prepared as above was spraying in a horizontal direction upon the test plate for several times to cover the surface of the oily fouling, with a horizontal spraying distance between the sprayer and the test plate being 15 cm. After the cleaned oily fouling flowed down, the cleaned test plate was left to dry. The post-cleaning and dried test plate was weighed as "M2".

The drying time period in minutes was regarded as a drying speed.

During step iii), the odor of the cleaning composition was evaluated by the operator's smell, and was recorded in different levels: slight, moderately slight, moderate, moderately strong, and strong.

The cleaning ability represents the ratio of the mass of the fouling removed from the fouled surface by the cleaning composition to the total mass of the fouling on the fouled surface (i.e., the surface to be cleaned).

The cleaning ability may be calculated according to the equation (I) below:

$$X1=[(M1-M2)/(M1-M0)]*100\% \quad (I)$$

X1 cleaning ability, 99,

M0: mass of steel plate, g,

M1: mass of fouled steel plate before cleaning, g

M2: mass of fouled steel plate after cleaning and drying, g.

TABLE 1

Test of component a)

| Component | Material | CEx. 1 | CEx. 2 | Ex. 3 | Ex. 4 | Ex. 5 |
|---|---|---|---|---|---|---|
| a) | 6# solvent oil | 30 | | | | |
| | 120# solvent oil | | 30 | | | |
| | Isohexane | | | 30 | | |
| | Isoheptane | | | | 30 | |
| | n-heptane | | | | | 30 |
| b) | D20 | 20 | 20 | 20 | 20 | 20 |
| c) | Isoparaffin G | 10 | 10 | 10 | 10 | 10 |
| d) | Ethanol | 10 | 10 | 10 | 10 | 10 |
| e) | Isopropanol | 5 | 5 | 5 | 5 | 5 |
| f) | Acetone | 5 | 5 | 5 | 5 | 5 |
| g) | E-1307 | 0.1 | 0.1 | 0.1 | 0.1 | 0.1 |
| h) | $CO_2$ | 1.9 | 1.9 | 1.9 | 1.9 | 1.9 |
| i) | Propane/butane(3:7) | 18 | 18 | 18 | 18 | 18 |
| Evaluation | Cleaning ability, % | 95.3 | 94.8 | 99.2 | 96.3 | 97.0 |
| | Odor | Slight | Slight | Slight | Moderately slight | Moderately slight |
| | Drying speed, min | 3 | 3.5 | 3 | 3.5 | 3.5 |

It can be seen from Table 1 that when component a) was selected from the group consisting of 6# solvent oil, 120# solvent oil, isohexane, isoheptane, and n-heptane, a strong cleaning ability (higher than 90%), an appropriate drying speed (3 to 3.5 mins) was achieved, and the odor was acceptably slight or moderately slight. However, 6# solvent oil used in CEx. 1, and 120# solvent oil used in CEx. 2 contained aromatic hydrocarbon(s), and thus were toxic. In contrast, isohexane, isoheptane, and n-heptane in Exs. 3 to 5 did not contain aromatic hydrocarbons and thus were environmentally friendly. Especially when component a) was isohexane, an optimum balance was obtained among a cleaning ability as high as 99.2%, a slight odor, an appropriate drying speed, a very low toxicity and low cost.

TABLE 2

Test of component b)

| Component | Material | Ex. 3 | CEx. 6 | CEx. 7 |
|---|---|---|---|---|
| a) | Isohexane | 30 | 30 | 30 |
| b) | D20 | 20 | | |
| | D30 | | 20 | |
| | D80 | | | 20 |
| c) | Isoparaffin G | 10 | 10 | 10 |
| d) | Ethanol | 10 | 10 | 10 |
| e) | Isopropanol | 5 | 5 | 5 |
| f) | Acetone | 5 | 5 | 5 |
| g) | E-1307 | 0.1 | 0.1 | 0.1 |
| h) | $CO_2$ | 1.9 | 1.9 | 1.9 |
| i) | Propane/butane (3:7) | 18 | 18 | 18 |
| Evaluation | Cleaning ability, % | 99.2 | 88.4 | 76.8 |
| | Odor | Slight | Slight | Slight |
| | Drying speed, min | 3 | 6 | 10 |

It can be seen from Table 2 when component b) was D20 in Ex. 3, an optimum balance was obtained among a cleaning ability as high as 99.2%, a slight odor, an appropriate drying speed, and a very low toxicity. In contrast, when component b) was D30 in CEx. 6, or D80 in CEx. 7, the cleaning ability decreased, and the drying speed was too slow.

TABLE 3

| Test of component e) | | | | | | |
|---|---|---|---|---|---|---|
| Component | Material | Ex. 3 | CEx. 8 | CEx. 9 | CEx. 10 | CEx. 11 |
| a) | Isohexane | 30 | 30 | 30 | 30 | 30 |
| b) | D20 | 20 | 20 | 20 | 20 | 20 |
| c) | Isoparaffin G | 10 | | | | |
| | Isoparaffin C | | 10 | | | |
| | Isoparaffin E | | | 10 | | |
| | Isoparaffin H | | | | 10 | |
| | Isoparaffin L | | | | | 10 |
| d) | Ethanol | 10 | 10 | 10 | 10 | 10 |
| e) | Isopropanol | 5 | 5 | 5 | 5 | 5 |
| f) | Acetone | 5 | 5 | 5 | 5 | 5 |
| g) | E-1307 | 0.1 | 0.1 | 0.1 | 0.1 | 0.1 |
| h) | $CO_2$ | 1,9 | 1.9 | 1.9 | 1.9 | 1.9 |
| i) | Propane/butane (3:7) | 18 | 18 | 18 | 18 | 18 |
| Evaluation | Cleaning ability, % | 99.2 | 81.5 | 85.6 | 76.3 | 73.4 |
| | Odor | Slight | Slight | Slight | Moderately slight | Moderately slight |
| | Drying speed, min | 3 | 1 | 5 | 8 | 12 |

It can be seen from Table 3 when component c) was isoparaffin G in Ex. 3 an optimum balance was obtained among a cleaning ability as high as 99.21%, a slight odor, an appropriate drying speed, and a very low toxicity. In contrast, when component c) was isoparaffin C in CEx. 8, isoparaffin E in CEx. 9, isoparaffin H in CEx. 10, or isoparaffin L in CEx. 11, the cleaning ability decreased, and the drying speed was too low or too high.

TABLE 4

| Test of amounts of components a) to c) | | | | | | | |
|---|---|---|---|---|---|---|---|
| Component | Material | Ex. 12 | Ex. 13 | CEx. 14 | Ex. 15 | Ex. 16 | Ex. 17 |
| a) | Isohexane | 25 | 35 | 30 | 30 | 30 | 30 |
| b) | D20 | 20 | 20 | 15 | 30 | 20 | 20 |
| c) | Isoparaffin G | 10 | 10 | 10 | 10 | 15 | 5 |
| d) | Ethanol | 10 | 10 | 10 | 10 | 10 | 10 |
| e) | Isopropanol | 5 | 5 | 5 | 5 | 5 | 5 |
| f) | Acetone | 5 | 5 | 5 | 5 | 5 | 5 |
| g) | E-1307 | 0.1 | 0.1 | 0.1 | 0.1 | 0.1 | 0.1 |
| h) | $CO_2$ | 1.9 | 1.9 | 1.9 | 1.9 | 1.9 | 1.9 |
| i) | Propane/butane (3:7) | 18 | 18 | 18 | 18 | 18 | 18 |
| Evaluation | Cleaning ability, % | 95.3 | 99.4 | 81.7 | 95.6 | 97.2 | 90.1 |
| | Odor | Slight | Slight | Moderately slight | Slight | Slight | Slight |
| | Drying speed, min | 3 | 3 | 4 | 3 | 3.5 | 3.5 |

It can be seen from Tables 1 and 4 that when the amount of component a) in Exs. 3, 12 and 13 were appropriately within the range from 25 to 35 parts by weight, the cleaning ability was higher than 95%, the drying speed was appropriate, and the odor was slight.

When the amount of component b) in CEx. 14 was too low (15 parts by weight), the cleaning ability undesirably decreased. When the amount of component b) in Exs. 3 and 15 was between 18 to 30 parts by weight, the cleaning ability was higher than 95%, the drying speed was appropriate, and the odor was slight.

When the amount of component c) in Exs. 3, 16 and 17 was between 5 to 15 parts by weight, the cleaning ability was higher than 90%, the drying speed was appropriate, and the odor was slight.

TABLE 5

| Test of amounts of components d) and e) | | | | |
|---|---|---|---|---|
| Component | Material | Ex.3 | CEx.18 | CEx.19 |
| a) | Isohexane | 30 | 45 | 5 |
| b) | D20 | 20 | 20 | 20 |
| c) | Isoparaffin G | 10 | 10 | 10 |
| d) | Ethanol | 10 | 0 | 20 |
| e) | Isopropanol | 5 | 0 | 20 |
| f) | Acetone | 5 | 5 | 5 |
| g) | E-1307 | 0.1 | 0.1 | 0.1 |
| h) | $CO_2$ | 1.9 | 1.9 | 1.9 |
| i) | Propane/butane (3:7) | 18 | 18 | 18 |
| Evaluation | Cleaning ability, % | 99.2 | 50 | 65 |
| | Odor | Slight | Slight | Slight |
| | Drying speed, min | 3 | 2 | 5 |

It can be seen from Tables 5 and 1 that when the amounts of components d) and e) were 0 in CEx. 18, the cleaning ability dramatically decreased, and the drying speed was too fast. When the amounts of components d) and e) were too high in CEx. 19, the cleaning ability dramatically decreased, and the drying speed was too slow.

TABLE 6

Test of HLB of component g)

| Component | Material | CEx. 20 | CEx. 21 | Ex. 22 | CEx. 23 | CEx. 24 | CEx. 25 | CEx. 26 |
|---|---|---|---|---|---|---|---|---|
| a) | Isohexane | 30 | 36 | 30 | 30 | 30 | 30 | 30 |
| b) | D20 | 20 | 20 | 20 | 20 | 20 | 20 | 20 |
| c) | Isoparaffin G | 10 | 10 | 10 | 10 | 10 | 10 | 10 |
| d) | Ethanol | 10 | 10 | 10 | 10 | 10 | 10 | 10 |
| e) | Isopropanol | 5 | 5 | 5 | 5 | 5 | 5 | 5 |
| f) | Acetone | 5 | 5 | 5 | 5 | 5 | 5 | 5 |
| g) | E-1305 (HLB 10.5) | 0.1 | | | | | | |
| | E-1306 (HLB 11.2) | | 0.1 | | | | | |
| | E-1308 (HLB 13) | | | 0.1 | | | | |
| | E-1310 (HLB 13.5) | | | | 0.1 | | | |
| | E-1312 (HLB 14.5) | | | | | 0.1 | | |
| | E-1315 (HLB between 14.5 to 18) | | | | | | 0.1 | |
| | E-1320 ( HLB between 14.5 to 18) | | | | | | | 0.1 |
| h) | $CO_2$ | 1.9 | 1.9 | 1.9 | 1.9 | 1.9 | 1.9 | 1.9 |
| i) | Propane/butane (3:7) | 18 | 18 | 18 | 18 | 18 | 18 | 18 |
| Evaluation | Cleaning ability, % | 68 | 80 | 95 | 86 | 82 | 80 | 73 |
| | Odor | Slight | Slight | Slight | Slight | Slight | Slight | Slight |
| | Drying speed, min | 3 | 3 | 3 | 3 | 3 | 3 | 3 |

It can be seen from Tables 6 and 1 that when the HLB value of g) was between 12 (Ex. 3, E-1307) and 13 (Ex. 22, E-1308), optimum balance was obtained among a cleaning ability of no less than 95%, a slight odor, a fast drying speed, and a low toxicity. When the HLB value of g) was less than 12 (CExs. 20 and 21, E-1305 and E-1306), or larger than 13 (CExs. 23 to 26, E-1310, E-1312, E-1315, E-1320), the cleaning ability undesirably decreased.

What is claimed is:

1. A cleaning composition contained in an aerosol spray can, comprising:

a liquid cleaning mixture, comprising:
- a) from 25 to 35 parts by weight of a solvent selected from the group consisting of isohexane, isoheptane, n-heptane and mixtures thereof,
- b) from 18 to 30 parts by weight of a de-aromatized hydrocarbon solvent having 7 to 8 carbon atoms in its molecule,
- c) from 5 to 15 parts by weight of a branched aliphatic alkane having 10 to 11 carbon atoms,
- d) from 5 to 15 parts by weight of ethanol,
- e) from 1 to 15 parts by weight of isopropanol,
- f) from 1 to 10 parts by weight of acetone, and
- g) from 0.01 to 0.2 parts by weight of iso-tridecanol polyoxyethylene ether having a HLB value of 12 to 13, and a gas propellant.

2. The cleaning composition according to claim 1, wherein the iso-tridecanol polyoxyethylene ether has a HLB value of 12.

3. The cleaning composition according to claim 2, wherein b) the de-aromatized hydrocarbon solvent has a distillation range of from 120 to 160° C. and a closed cup flash point of about 20° C.

4. The cleaning composition according to claim 3, wherein c) the branched aliphatic alkane has a distillation range of from 161 to 173° C. and a closed cup flash point of about 44° C.

5. The cleaning composition according to claim 1, wherein the cleaning composition comprises:

a liquid cleaning mixture, comprising:
- a) from 28 to 32 parts by weight of isohexane,
- b) from 18 to 22 parts by weight of a de-aromatized hydrocarbon solvent having 7 to 8 carbon atoms in its molecule, which has a distillation range of from 120 to 160° C. and a closed cup flash point of about 20° C.,
- c) from 5 to 10 parts by weight of a branched aliphatic alkane having 10 to 11 carbon atoms, which has a distillation range of from 161 to 173° C. and a closed cup flash point of about 44° C.,
- d) from 8 to 10 parts by weight of ethanol,
- e) from 4 to 6 parts by weight of isopropanol,
- f) from 4 to 6 parts by weight of acetone, and
- g) from 0.1 to 0.2 parts by weight of iso-tridecanol polyoxyethylene ether having a HLB value of 12 to 13, and a gas propellant.

6. The cleaning composition according to claim 1, wherein the gas propellant comprises a gas selected from the group consisting of carbon dioxide, propane, and butane.

7. The cleaning composition according to claim 1, wherein the gas propellant comprises:
- h) from 1 to 5 parts by weight of carbon dioxide, and
- i) from 10 to 30 parts by weight of a mixture of propane and butane in a volume ratio of about 1-4:9-6.

8. The cleaning composition according to claim 7, wherein the mixture of propane and butane is in a volume ratio of about 3:7.

9. A method of preparing the cleaning composition according to claim 1, comprising:

mixing components a) to g) to obtain a liquid cleaning mixture, packaging the liquid cleaning mixture into an aerosol spray can and sealing the can, and filling the gas propellant into the sealed can.

10. The method according to claim 9, further comprising:

filtering the liquid cleaning mixture before packaging it into the aerosol spray can.

11. A method of cleaning apart of a vehicle or a machine comprising:

a. positioning a part or machine such that a surface comprising oily fouling is at an inclined angle from horizontal;

b. applying the cleaning composition according to claim 1 to the surface in an amount sufficient to cover the surface of the part or machine and remaining at an inclined angle such that the cleaning composition can flow off the surface;

c. permitting the cleaning composition and oily fouling removed from the surface to flow off the part.

12. The method of cleaning according to claim 11, wherein the vehicle is an automobile.

13. The method of cleaning according to claim 11, wherein the part of a vehicle a brake disc.

14. The method of cleaning according to claim 11, wherein the part is made from rubber or plastic.

15. The method of cleaning according to claim 11, wherein the part is made from polypropylene and/or polycarbonate.

* * * * *